July 17, 1923.
H. E. KELLOGG
SUBMERGED BEARING
Filed Nov. 21, 1921
1,462,366
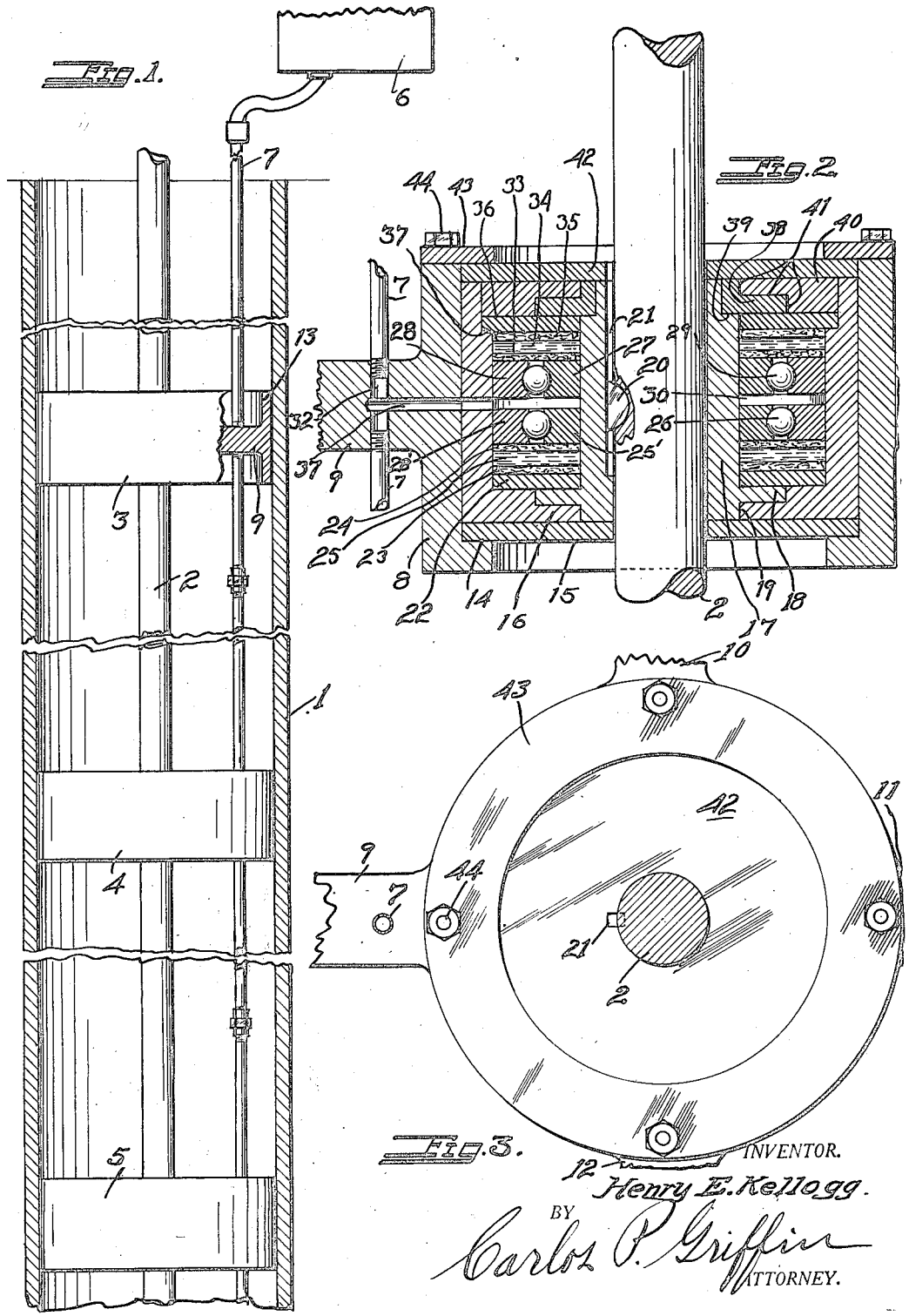
INVENTOR.
Henry E. Kellogg.
BY
Carlos P. Griffin
ATTORNEY.

Patented July 17, 1923.

1,462,366

UNITED STATES PATENT OFFICE.

HENRY E. KELLOGG, OF MOUNTAIN VIEW, CALIFORNIA.

SUBMERGED BEARING.

Application filed November 21, 1921. Serial No. 516,581.

*To all whom it may concern:*

Be it known that I, HENRY E. KELLOGG, a citizen of the United States, residing at Mountain View, in the county of Santa Clara, State of California, have invented a new and useful Submerged Bearing, of which the following is a specification in such full and clear terms as will enable those skilled in the art to construct and use the same.

This invention relates to improvements in submerged bearings and relates more particularly to bearings for submerged pumps, and the object of the invention is to provide for excluding water from the bearings by means of a counteracting pressure of lubricating oil.

Another object of the invention is to provide a ball bearing with enclosing means that can be readily assembled and installed for operation.

Another object of the invention is to make the enclosing means fluid tight, but so designed that friction will be reduced to a minimum.

Another object of the invention is to provide a ball bearing unit that can be applied to the pump shaft at different points and in spaced relation throughout its length.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a sectional view showing how the bearings are applied to the pump shaft.

Fig. 2 is a vertical sectional view through one of the bearings, and

Fig. 3 is a plan of one of the bearings.

The numeral 1 indicates a well casing, 2 is a pump shaft which connects with a submerged pump and is driven by any well known means not shown, as this invention pertains only to the bearings which are represented at 3, 4 and 5. 6 is an oil tank which may be elevated to any desired height to obtain the required pressure, the purpose of which will presently appear, and 7 indicates a pipe connecting the tank to the different bearings.

The bearings consist of an outer housing 8 which in the present instance has radial arms 9 to 12 inclusive connecting a rim 13 contacting with the inside surface of the casing 1.

The housing 8 has the shoulder 14 on which rests a plate 15 which is tight on the housing 8, and has a hole in its center allowing the shaft 2 to turn freely therein. Fitting tightly into the housing 8 and resting on the plate 15 is the shell 16.

A sleeve 17 fitting loosely on the shaft 2 has a flange 18 adapted to run freely in a recess in the shell 16 and a portion running freely in the hole 19 through the bottom of the shell 16. The sleeve 17 is turned with the shaft 2 by means of the key 20 in the shaft and keyway 21 in the shell.

A plate 22 is fitted tightly in the shell 16 and loosely on the sleeve 17. Above this plate is a washer 23 of fibrous material like felt, and spaced from this washer is another washer 24 of the same material, the space being filled with heavy grease 25. Above this washer is a ball bearing with the inner ring 25' fast on the sleeve 17, and the outer ring 28' fast on the shell 16, the raceway having balls 26. Spaced from this bearing is a duplicate bearing with the inner ring 27 fast on the sleeve 17 and the outer ring 28 fast on the shell 16 with the balls 29.

Communicating with the space 30 between the ball bearings is a hole 31 which extends into the arm 9 to a hole 32 which is provided with threads for the pipe 7. Above the upper ball bearing is the fibrous washer 33, space 34 filled with heavy grease, and the fibrous washer 35, and above that is the plate 36 which is supported by the shoulder 37 and is fixed to the shell 16 and has a free bearing on the sleeve 17.

Fixed to the sleeve 17 is the flange 38 which is supported on the shoulder 39. A ring 40 is fixed to the shell 16 and has a free bearing on the flange 38 at the points 41. A plate 42 is held in place by the ring 43 by means of bolts 44.

In operation the space 30 is filled with oil before being enclosed by the upper packing and plates, so that all air is replaced by the oil. Revolving with the shaft 2 is the sleeve 17, the ring 38 and the inner rings of the ball bearings. The keyway 21 is made long so that the vertical vibrations of the shaft will not affect the bearings.

The oil tank 6 has sufficient elevation to give a pressure to the oil inside the bearings which will be equal to the pressure of water on the outside of the bearings, or the pressure of the oil may be slightly greater than the water pressure.

What I claim is as follows, but various modifications may be made in the construction shown in the drawings and above particularly described form, within the purview of my invention:

1. In combination, a shaft, a cylindrical member slidably mounted thereon to rotate therewith, and carrying outwardly extending spaced flanges, a fixed cylindrical member carrying flanges overlapping and engaging said first mentioned flanges, and a bearing inserted between said fixed and movable members and intermediate said spaced engaging flanges.

2. In combination, a shaft, a cylindrical member slidably mounted thereon to rotate therewith and carrying outwardly extending spaced flanges, a fixed cylindrical member carrying flanges overlapping and engaging the outer surfaces of said first mentioned flanges, a bearing inserted between said fixed and movable members and intermediate said spaced engaging flanges, and plates carried by said member and overlapping and engaging the inner surfaces of said first mentioned flanges.

3. In combination, a shaft, a cylindrical member slidably mounted thereon to rotate therewith and carrying outwardly extending spaced flanges, a fixed cylindrical member carrying flanges overlapping and engaging said first mentioned flanges, a bearing inserted between said fixed and movable members and intermediate said spaced engaging flanges, spaced packing glands on each side of said bearing, and a viscous lubricating fluid filling the spaces between said glands.

4. A submerged bearing of the class described comprising a pair of bearing members spaced apart, a shaft, a sleeve adapted to revolve with said shaft, upper and lower flanges on said sleeve, packing between said bearings and said flanges, a housing for retaining said bearings, packing and sleeve, and means to supply the bearings and space between the bearings with lubricant under pressure, said pressure to be as great as any fluid pressure on the outside of said bearing.

5. In combination, a shaft, a cylindrical member slidably mounted thereon to rotate therewith and carrying outwardly extending spaced flanges, a fixed cylindrical member carrying flanges overlapping and engaging said first mentioned flanges, a bearing inserted between said fixed and movable members and intermediate said spaced engaging flanges, and means for introducing lubricating fluid into said bearing.

6. A submerged bearing of the class described comprising a shaft, a sleeve revoluble with said shaft, a pair of ball bearing members spaced apart on said sleeve, upper and lower flanges on said sleeve, a pair of spaced packing glands above and below said bearings, said spaces being filled with thick fluid, plates above and below said packing glands, said plates adapted to contact with said upper and lower flanges of said sleeve and to bear on shoulders in a cylindrical shell, said shell having retaining plates above and below, an enclosing housing, a port through said housing and said shell leading to the space between said bearing members, a pipe connection between said port, and a tank adapted to contain a fluid lubricant.

7. In combination, a shaft, a cylindrical member slidably mounted thereon to rotate therewith and carrying outwardly extending spaced and shouldered flanges, a fixed member carrying shouldered flanges overlapping and engaging said first mentioned shouldered flanges, and a bearing inserted between said fixed and movable members and intermediate said spaced engaging flanges.

In testimony whereof I have hereunto set my hand this 14th day of November, A. D. 1921.

HENRY E. KELLOGG.